United States Patent Office 3,240,752
Patented Mar. 15, 1966

3,240,752
POLYESTER COMPOSITIONS LIGHT STABILIZED WITH DIBENZOYL METHANE
John W. Tamblyn, Kingsport, Tenn., assignor to Eastman Kodak Company, Rochester, N.Y., a corporation of New Jersey
No Drawing. Filed Nov. 9, 1961, Ser. No. 151,153
4 Claims. (Cl. 260—45.95)

This invention relates to polyester compositions stabilized relative to ultraviolet light.

Polyesters, as is well known in the art, are normally solid, thermoplastic, polymeric materials obtained as by the esterification of polyhydric alcohols and polybasic carboxylic acids. They have achieved widespread use in fibers, films, and the like. They present a problem, however, in that they are adversely affected by light and particularly ultraviolet light. For example, after prolonged exposure to ultraviolet light, polyester films tend to become brittle and crack upon flexure.

A general object of this invention is to provide a solution to this problem.

More particularly, an object of this invention is to provide a polyester composition containing an additive effective to stabilize the polyester component thereof relative to ultraviolet light.

These and other objects are achieved by this invention.

In summary, this invention broadly comprises a generic, light stabilized, polyester composition consisting essentially of a polyester component and the compound: ortho-hydroxydibenzoyl methane, which, for convenience is referred to hereinafter as o-hydroxydibenzoyl methane.

This invention is based on our discovery that o-hydroxydibenzoyl methane, which has the formula

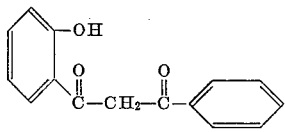

and which can be readily prepared by molecular rearrangement of ortho-benzoyloxy-acetophenone, is an effective light stabilizer for polyesters. We have found that this compound is stable at the usual temperatures employed in incorporating additives into polyesters and in forming articles from polyester compositions. At such temperatures o-hydroxydibenzoyl methane in polyester compositions does not develop objectionable odor and does not lose much, if any is lost, of its light stabilizing activity. The effectiveness of this compound as a light stabilizer for polyesters does not depend on the composition of the polyester component; this compound is an effective light stabilizer for any polyester and polyester mixtures.

Concentration of o-hydroxydibenzoyl methane in the general polyester composition of this invention can vary. In general, it depends upon the extent of light stabilization desired. This in turn depends upon many variables, including the end use of the polyester composition. However, for most purposes a concentration in a range from about 0.1% to about 10% by weight of the polyester composition gives satisfactory results.

The polyester composition of this invention is prepared by incorporating o-hydroxydibenzoyl methane into the polyester component. Such incorporation can be accomplished by any of the usual melt compounding and dope compounding procedures employed for polyester compositions.

This invention is further illustrated by the following examples of various aspects thereof including specific embodiments. Unless otherwise indicated, this invention is not limited to these embodiments.

Example 1

This example illustrates the preparation of o-hydroxydibenzoyl methane.

Admix 10 grams (0.072 mole) of potassium carbonate and 10 grams (0.042 mole) of ortho-benzoyloxyacetophenone in 50 milliliters of pyridine and heat at reflux for 1 hour. Pour the resulting reaction mixture onto ice and neutralize according to Congo Red paper with concentrated hydrochloric acid. Collect the yellow solid which forms and recrystallize it from 250 milliliters of methanol. The product at this point is typically a solid in the form of yellow, needle-like crystals, having a dry weight of about 6 grams and melting at about 112°–118° C. Dissolve the product in ethanol and crystallize. The thus purified product is typically a solid in the form of light yellow, needle-like crystals having a dry weight of about 4 grams and melting at about 120°–121° C.

Example 2

This example illustrates a specific light stable polyester composition of this invention, its preparation by dope compounding and how it typically compares to other polyester compositions.

Dissolve in tetrachloroethane 5 parts by weight of o-hydroxydibenzoyl methane and 100 parts by weight of a polyester made from 4,4'-sulfonyl dibenzoic acid, sebacic acid and 1,5-pentanediol on about a 1:1:2 mole basis. Cast the resulting solution as a film of thickness of about 3 mils and evaporate the tetrachloroethane.

To test the light stability of the film, cut it into test specimens and expose the specimens in a modified Atlas Twin-Arc Weather-Ometer [Anal. Chem. 25, 460 (1953)] until they become brittle. The state of brittleness is deemed to be reached when the film specimen breaks on one hard crease with the exposed side of the film on the outside of the crease.

For purposes of comparison prepare by the same procedure other films from the same polyester, in one case without any additive and in the other cases, instead of 5 parts by weight of o-hydroxydibenzoyl methane, 5 parts by weight of such compounds as dibenzoyl methane, o - methoxydibenzoyl methane, di-(o-methoxybenzoyl) methane, and di-(p-methoxybenzoyl)methane. Cut these films into test specimens and expose them in the modified Atlas Twin-Arc Weather-Ometer instrument until they become brittle. Preferably, they should be exposed at the same time as, and along side of, the test specimens of the film containing o-hydroxydibenzoyl methane.

On the basis of these exposure tests determine the stabilization rating of each polyester composition and thus of the corresponding additive involved. Stabilization rating is the ratio of the exposure time required for the development of brittleness in the stabilized film to the corresponding exposure time for the unstabilized film. Typical stabilization ratings of these particular polyester compositions and thus of the additives are:

| Additive: | Stabilization rating |
|---|---|
| None | 1 |
| Dibenzoylmethane | 1 |
| o-Methoxydibenzoylmethane | 3 |
| Di-(o-methoxybenzoyl)methane | 3 |
| Di-(p-methoxybenzoyl)methane | 3 |
| o-Hydroxydibenzoyl methane | 11 |

Example 3

This example illustrates another specific, light stable polyester composition of this invention and its preparation.

Mix 1 part by weight of o-hydroxydibenzoyl methane with 100 parts by weight of powdered polyester made from 4,4'-sulfonyl dibenzoic acid and 1,5-pentanediol on about a 1:1 mole basis. Extrude at 575° F. the mixture as a 10 mil thick film. The film thus obtained has no objectionable color due to the additive.

Light stability testing by the procedure of Example 2 of this film, of a film of the same polyester without an additive but processed in the same way and of films of the same polyester with other additives such as those involved in Example 2 will give stabilization ratings similar to the typical ratings set out in Example 2.

*Example 4*

This example illustrates still another specific, light stable polyester composition of this invention and its preparation.

Mix 1 part of o-hydroxydibenzoyl methane with 100 parts of a polyester made from terephthalic acid and 4,4'-cyclohexanedimethanol on about a 1:1 mole basis. Extrude at 575° F. the mixture as a 10 mil thick film. The film, it will be observed, has no objectionable color due to the o-hydroxydibenzoyl methane.

Light stability tests by the procedure of Example 2 of test specimens of this film and of other films of the same polyester processed in the same way but in one case without an additive and in the other cases with additives such as those involved in Example 2 will give stabilization ratings similar to those listed in Example 2.

Thus, there are provided specific polyester compositions stabilized relative to ultraviolet light and comprising an additive which is heat stable. When incorporated into polyesters, under extrusion conditions, it does not develop objectionable color and it does not lose light stabilizing activity under extrusion temperature conditions.

Other features, advantages and specific embodiments of this invention will be apparent to those in the exercise of ordinary skill in the art after reading the foregoing disclosure. All embodiments of this invention including variations and modifications embracing the spirit and essential characteristics thereof are within the scope of the claimed subject matter unless specifically excluded by claim language.

I claim:

1. A light stabilized polyester composition containing o-hydroxydibenzoyl methane at a concentration in a range from about 0.1 to about 10 percent by weight of the composition, said polyester composition consisting essentially of about equal mole proportions of (1) a dicarboxylic acid selected from the group consisting of terephthalic acid, 4,4'-sulfonyldibenzoic acid and sebacic acid and (2) a glycol selected from the group consisting of 1,5-pentanediol and 1,4-cyclohexanedimethanol.

2. A light stabilized polyester composition consisting essentially of (1) a polyester of 4,4'-sulfonyl dibenzoic acid, sebacic acid and 1,5-pentanediol on about a 1:1:2 mole basis and (2) o-hydroxydibenzoyl methane at an effective, light stabilizing concentration.

3. A light stabilized polyester composition consisting essentially of (1) a polyester of 4,4'-sulfonyl dibenzoic acid and 1,5-pentanediol on about a 1:1 mole basis and (2) o-hydroxydibenzoyl methane at an effective, light stabilizing concentration.

4. A light stabilized polyester composition consisting essentially of (1) a polyester of terephthalic acid and 1,4-cyclohexane dimethanol on about a 1:1 mole basis and (2) o-hydroxydibenzoyl methane at an effective, light stabilizing concentration.

References Cited by the Examiner

UNITED STATES PATENTS

| | | | |
|---|---|---|---|
| 2,744,091 | 5/1956 | Caldwell | 260—75 |
| 2,890,193 | 6/1959 | Hardy | 260—45.95 |
| 3,001,970 | 9/1961 | Edel et al. | 260—45.95 |
| 3,006,887 | 10/1961 | Schoepffle et al. | 260—45.95 |
| 3,008,995 | 11/1961 | Hoeschele et al. | 260—45.95 |

LEON J. BERCOVITZ, *Primary Examiner.*

MILTON STERMAN, *Examiner.*